United States Patent [19]

Reitmeier

[11] Patent Number: 4,517,600
[45] Date of Patent: May 14, 1985

[54] ERROR CONCEALMENT SYSTEM USING DROPOUT SEVERITY INFORMATION FOR SELECTION OF CONCEALMENT METHOD

[75] Inventor: Glenn A. Reitmeier, Trenton, N.J.

[73] Assignee: RCA Corporation, Princeton, N.J.

[21] Appl. No.: 648,350

[22] Filed: Sep. 7, 1984

Related U.S. Application Data

[63] Continuation of Ser. No. 379,088, May 17, 1982, abandoned.

[51] Int. Cl.³ .................... H04N 5/21; H04N 9/535
[52] U.S. Cl. ................................ 358/166; 358/36;
358/37; 358/163; 358/167; 358/314; 358/336;
358/327; 371/65
[58] Field of Search ............... 358/21 R, 37, 36, 163,
358/166, 167, 314, 336, 315, 327, 160; 360/38;
371/31, 65

[56] References Cited

U.S. PATENT DOCUMENTS

| | | | |
|---|---|---|---|
| 4,122,489 | 10/1978 | Bolger | 358/21 R |
| 4,368,483 | 1/1983 | Liu | 358/314 |
| 4,376,289 | 3/1983 | Reitmeier | 358/163 |
| 4,376,955 | 3/1983 | Reitmeier | 358/314 |
| 4,377,820 | 3/1983 | Reitmeier | 358/21 R |
| 4,381,519 | 4/1983 | Wilkinson | 358/21 R |

Primary Examiner—Tommy P. Chin
Attorney, Agent, or Firm—E. M. Whitacre; P. J. Rasmussen; W. H. Meise

[57] ABSTRACT

An error concealment system for a digital video signal uses different methods of concealment in accordance with the severity of the error. An adaptive estimate (horizontal or vertical average) is used if all pixels need for such an estimate are valid. If not, a four pixel average is used. If that is not possible a vertical average is used, and finally a horizontal average is used. If the error is very severe, then a line store provides the last valid line.

4 Claims, 3 Drawing Figures

ERROR CONCEALMENT SYSTEM USING DROPOUT SEVERITY INFORMATION FOR SELECTION OF CONCEALMENT METHOD

This is a continuation of application Ser. No. 379,088, filed May 17, 1982, now abandoned.

BACKGROUND OF THE INVENTION

The present invention relates to dropout compensation of a sampled television signal, and more particularly, to a method wherein the severity of the dropout determines the dropout concealment method used.

A U.S. Pat. No. 4,470,065 entitled "Adaptive Error Concealment Using Horizontal Information Determination from Adjacent Lines" filed Mar. 25, 1982, in the name of G. A. Reitmeier and assigned to the assignee of the present invention describes a method of adaptive dropout compensation for dropouts which affect a portion of the samples, said portion occurring over a duration of less than one television line in the displayed picture, while another previous application entitled "Interleaved Recording Format for Digital Video," Ser. No. 241,925, filed Mar. 9, 1981 and assigned to the assignee of the present invention, now U.S. Pat. No. 4,393,414, describes a method of formatting component video on tape so that dropouts occur in an interleaved pattern. In an actual DVTR (digital video tape recorder), the majority of dropouts will be of duration less than one line, and can be concealed using the adaptive technique of said first filed application. However, some dropouts of longer duration may occur, and it's essential that none of these dropouts results in a noticeable flash on the screen, as could occur when an adaptive technique is used with erroneous pixels that are proximate the erroneous pixel to be concealed. Hence, it is important to match the method of error concealment with the severity of the tape dropout, since high quality concealment is desirable for the many small errors, while a lower quality concealment can be used for very large errors. This is because small dropouts leave more adjacent data (valid pixels) with which to obtain a good replacement pixel, while concealment algorithms that handle large, e.g. greater then one horizontal line, dropouts cannot take advantage of that fact.

It is therefore desirable to provide a dropout concealment system where the concealment method is determined by the severity of the dropout.

SUMMARY OF THE INVENTION

Method and apparatus for concealing an erroneous sample of a sampled video signal, comprising generating a plurality of estimates of the erroneous sample from samples proximate said erroneous sample according to a variety of methods, determining which, if any, of said proximate samples used to derive said estimates are also erroneous samples, and selecting one of said estimates produced by a most preferred method of estimation which does not utilize an erroneous sample in producing said estimate.

DESCRIPTION OF THE DRAWINGS

FIG. 2 shows an erroneous pixel surrounded by good pixels; and

DETAILED DESCRIPTION

First considering FIG. 2, an erroneous reference pixel $v_M(n)$ (indicated by an "X") is surrounded by valid pixels (indicated by "Os"). However, this pattern is not necessary for the operation of the invention. The top, middle and bottom lines are indicated by the subscripts T, M and B respectively, while $(n-1)$, $(n)$ and $(n+1)$ indicate pixels in the column one sampling period to the left of the column having the reference pixel, pixels in the same column as the reference pixel, and pixels in the column one sampling period to the right of the column having the reference pixel, respectively.

Figure 1:
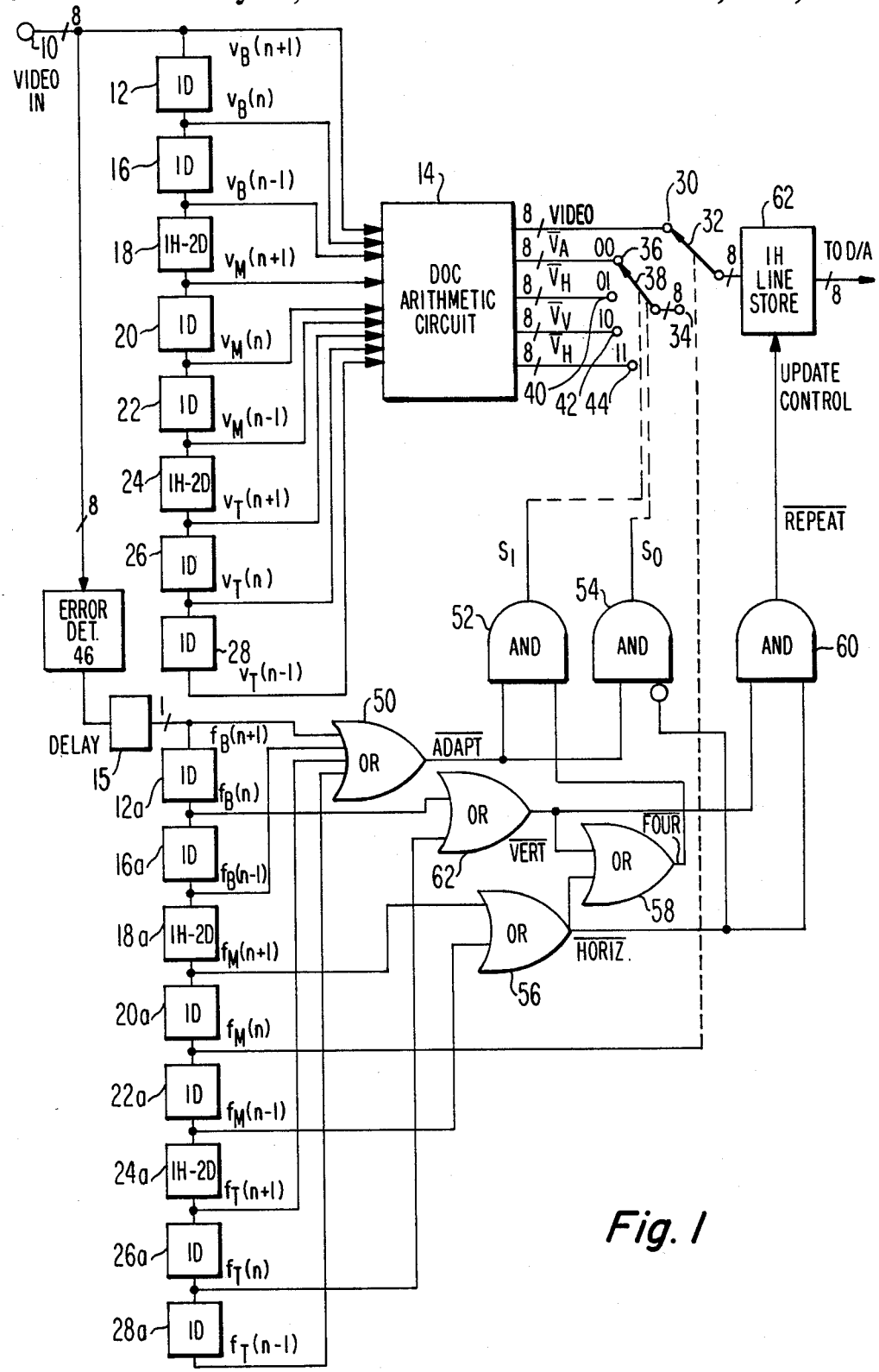
FIG. 1 shows a block diagram of a system in accordance with the invention.

FIG. 1 shows a block diagram of a system in accordance with the invention. Eight-bit input terminal 10 receives an eight-bit digitized video signal component from a transmission channel subject to errors, e.g. a DVTR. Other numbers of bits can be used in the digitization of the video signal. The input signal at the instant shown represents pixel $v_B(n+1)$ shown in FIG. 2 and is applied to eight-bit delay line 12 (8 delay lines, one for each bit) and to DOC (drop out corrector) arithmetic circuit 14 (described below in conjunction with FIG. 3). Delay line 12 delays its input signal by one sampling period (the reciprocal of the sampling frequency) as indicated by "D", and thus its output signal comprises pixel $v_B(n)$. This output signal is applied to circuit 14 and to one sampling period eight-bit delay line 16. The output signal from delay line 16 corresponds to pixel $v_B(n-1)$, and it is applied to circuit 14 as well as to eight-bit delay line 18, which has a delay of one horizontal line period minus two sampling periods as indicated by "1H-2D".

The output signal from delay line 18 comprises the pixel $v_M(n+1)$ and is applied to circuit 14 and to eight-bit delay line 20, which has a delay of one sampling period. The output signal from delay line 20 comprises the pixel $v_M(n)$, i.e. the center reference pixel that is assumed invalid due to e.g. a dropout. The output signal from delay line 20 is applied to circuit 14 and to eight-bit delay line 22. Delay line 22 has a delay of one sampling period, and thus its output signal comprises the pixel $v_M(n-1)$, which signal is applied to circuit 14 and to eight-bit delay line 24.

Delay line 24 has a delay of one horizontal period minus two sampling periods, and thus its output signal comprises pixel $v_T(n+1)$. This output signal is applied to circuit 14 and to eight-bit delay line 26. Delay line 26 has a delay of one sampling period, and thus its output signal comprises pixel $v_T(n)$. This output signal is applied to circuit 14 and to eight-bit delay line 28. Delay line 28 has a delay of one sampling period, and thus its output signal comprises pixel $v_T(n-1)$, which output signal is applied to circuit 14.

DOC arithmetic circuit 14 provides five output signals. The first signal is called "video", since it is the current pixel $v_M(n)$, which pixel is delay matched to the various signal averages or estimates described immediately herein below. The signal "video" is applied to eight-bit contact 30 of eight-bit two-position switch 32. The second signal is an adaptive estimate $\bar{v}_A$ of the current erroneous pixel and is applied to eight-bit contact 36 of eight-bit four-position switch 38. The third signal is a four pixel estimate $v_4$, which is applied to eight-bit contact 40 of switch 38. The fourth signal is a vertical estimate $\bar{v}_V$, which is applied to eight-bit contact 42 of switch 38. Finally, the fifth signal is a horizontal estimate $\bar{v}_H$, which is applied to eight-bit contact 44 of switch 38. It should be understood that all of the outputs of DOC arithmetic circuit 14 are delay matched signals.

Error detector 46 provides an error flag output signal. The error flag is detectable in several ways, such as low amplitude information from the recording channel, information from the recording code that is used, or from special error detecting codes that have been used with the video data. Output from error detector 46 is connected to delay line 15, the purpose of which is to match the delay of DOC arithmetic circuit 14. A delay line chain that is identical to the one described above for the video signal (except that the delay lines are one-bit wide rather than 8 bits wide) provides error flag signals, when the video pixels are in error. The error flag delay line chain therefore has identical reference numerials with the suffix "a" added, i.e. 12a, 16a, 18a, 20a, 22a, 24a, 26a, and 28a. Further as with the video pixels, the subscripts B, M, and T indicate error flags associated with the bottom, middle and top lines respectively, while (n+1), (n) and (n−1) indicate error flags associated with pixels in the column to the right of the reference pixel, in the same column, and in the column to the left of the reference pixel, respectively. Thus the error flag received at input 46 is designated $f_B(n+1)$ with the remaining error flags following along the delay line chain in the same order as for the video signal.

The adaptive estimate is generated by first determining if there is horizontal information in the portions of the top and bottom lines adjacent to pixel $v_M(n)$. This requires that the corner pixels $v_T(n-1)$, $v_T(n+1)$, $v_B(n-1)$ and $v_B(n+1)$ be valid (not erroneous). In addition, to actually compute the estimate in accordance with the prior horizontal information determination, the pixels $v_B(n)$, $v_M(n-1)$, $v_M(n+1)$ and $v_T(n)$ must also be valid.

Since $f_T(n-1)$, $f_T(n+1)$, $f_B(n-1)$ and $f_B(n+1)$ are the error flags associated with the corner pixels needed for an adaptive estimate, these are logically combined by OR gate 50, and if any one is in error an adaptive estimate cannot be used, although a four-point average, a vertical average, or a horizontal average may still be possible. The output signal from gate 50 is applied to AND gates 52 and 54. Since $f_M(n-1)$ and $f_M(n+1)$ are the error flags associated with the pixels needed for a horizontal average, these are combined by OR gate 56. The output signal from gate 56 is applied to OR gate 58, an inverting input of gate 54 and to AND gate 60. Similarly, since $f_T(n)$ and $f_B(n)$ are associated with the pixels needed for a vertical average, these are combined by OR gate 62. The output signal from gate 62 is applied to the remaining inputs of gates 58 and 60. The combining of the two output signals from gates 62 and 56 by gate 58 produces an error flag associated with all four pixels needed for a four-point average. We now have five error signals available: $\overline{ADAPT}$ from gate 50, which is ONE when the corner pixels needed for the adaptive part of the estimation procedure are in error; $\overline{FOUR}$ from gate 58, which is ONE when any of the pixels needed for four-point averaging are in error; $\overline{VERT}$ from gate 62, which is ONE when any of the pixels needed for a vertical average are in error; $\overline{HORIZ}$ from gate 56, which is ONE when any of the pixels needed for a horizontal average are in error; and $f_M(n)$ from delay line 20a, which is ONE when the current pixel is in error and must be replaced by an estimate.

Thus, if $\overline{ADAPT}$ and $\overline{FOUR}$ are both ZERO, the adaptive procedure may be used. Since then all 8 pixels needed for adaptive estimating are valid. When $\overline{FOUR}$ is ZERO the four-point average may be used. When $\overline{VERT}$ is ZERO the vertical average may be used. Finally when $\overline{HORIZ}$ is ZERO the horizontal average may be used.

The output signals from gates 52 and 54 are bits of a control signal (indicated by dotted lines) for switch 38 and are respectively designated $S_1$ and $S_0$. The numbers next to contacts 36, 40, 42, and 44 indicate the control signal state of signals $S_1$ and $S_0$ required for the switch 38 to engage the particular contact and are logic 00, 01, 10 and 11 respectively. Further the error flag signal $f_M(n)$ is applied as a control signal to switch 32 to select an actual pixel or one of the estimates as selected by switch 38.

The following table shows the error signal conditions and the desired action:

| $f_M(n)$ | $\overline{ADAPT}$ | $\overline{FOUR}$ | $\overline{VERT}$ | $\overline{HORIZ}$ | action | switch $S_1$ | control $S_0$ |
|---|---|---|---|---|---|---|---|
| 1 | 0 | 0 | 0 | 0 | adaptive | 0 | 0 |
| 1 | 1 | 0 | 0 | 0 | four-point | 0 | 1 |
| 1 | 1 | 1 | 0 | 1 | vertical | 1 | 0 |
| 1 | 1 | 1 | 1 | 0 | horizontal | 1 | 1 |
| 1 | 1 | 1 | 1 | 1 | catastrophy signal | 1 | 0 |
| 0 | X | X | X | X | current video | | |

In the above table "X" designates that the error signal conditions are irrelevant since $f_M(n)$ is ZERO and therefore no replacement estimate is required.

The output signal from switch 32 is applied to a one horizontal line (1H) store 60. The output signal from gate 60 indicates the occurrence of a catastrophic dropout. The output signal, called "REPEAT", is used to control the updating of line store 64, so that during a catastrophic dropout, the last vertically adjacent good data is repeated on the TV screen until good data again becomes available. The output signal from line store 64 is applied to a digital-to-analog converter (not shown), to generate an analog signal which can be displayed.

Figure 3:
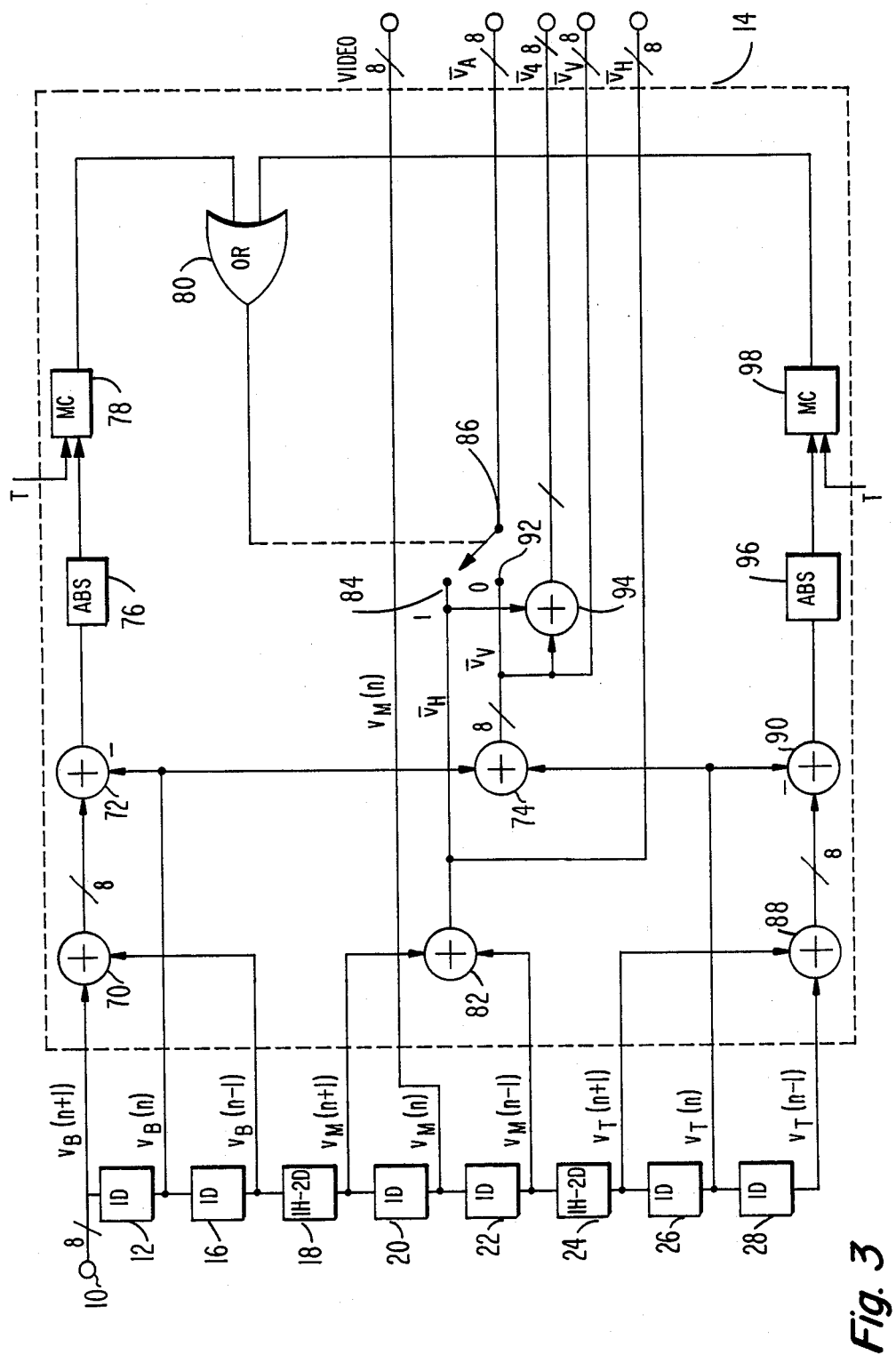
FIG. 3 shows a block diagram of an arithmetic circuit used in FIG. 1.

FIG. 3 shows a block diagram of DOC arithmetic circuit 14, wherein input terminal 10 and delay lines 12, 16, 18, 20, 22, 24, 26, and 28 of FIG. 1 are also shown for the sake of clarity.

The $v_B(n+1)$ and $v_B(n-1)$ signals are applied to 8-bit adder 70. The output signal from adder 70 comprises an average of the two input signals (using a hardwired right shift to achieve division by two), and thus is an estimate of the $v_B(n)$ signal, which is applied to 8-bit adder 72. The actual $v_B(n)$ signal is applied to the subtracting input of subtractor 72 and to 8-bit adder 74. The output signal from subtractor 72 comprises a signal representing the difference between the actual and estimated values of $v_B(n)$ and is applied to absolute value circuit 76. The output signal from circuit 76 is applied to magnitude comparator 78 along with a threshold signal T. Comparator 78 provides a ONE signal whenever the output of absolute value circuit 76 is less than the threshold signal amplitude and applies this signal to OR gate 80. That is a ONE is generated whenever the difference between the actual value and the horizontal estimate is less than the threshold value.

The $v_M(n+1)$ and $v_M(n-1)$ signals are applied to 8-bit adder 82, which adder provides the horizontal average signal $\bar{v}_H$ to 8-bit contact 84 of 8-bit switch 86. Signals $v_T(n+1)$ and $v_T(n-1)$ are applied to 8-bit adder 88, which adder applies its output signal to 8-bit subtractor 90. The signal $v_T(n)$ is applied to the subtracting input of subtractor 90 and to adder 74. The output signal from adder 74 comprises the vertical average signal $\bar{v}_V$, which is applied to 8-bit contact 92 of switch 86 and to 8-bit adder 94. The output signal from adder 94 comprises the four point average signal $\bar{v}_4$.

The output signal from subtractor 90 is applied to absolute value circuit 96, which in turn applies its output signal (which represents the difference between the estimated and actual values of $v_T(n)$) to magnitude comparator 98. Threshold signal T also is applied to comparator 98, which comparator 98 provides a ONE signal to gate 80 when the output of circuit 96 is less than the threshold value. Thus, if either the top or bottom line has a horizontal estimate which is not sufficiently different from the actual sample value, i.e. the line contains low frequency horizontal information, gate 80 provides a ONE signal to control switch 86 so that it provides the $\bar{v}_H$ signal as an output signal, otherwise $\bar{v}_v$ is so provided. If desired gate 80 can comprises an AND gate, so that only if both top and bottom lines have horizontal information is $\bar{v}_H$ provided as an output signal, otherwise $\bar{v}_v$ is so provided.

It should be understood that many variations of this invention are possible. For example, three adaptive estimates could be selected among, based on the occurrence of error-free pixels on both adjacent scan lines, or on just the top or bottom scan line. Further, any subset of these conditions may be used, for example, line store 64 for catastrophic protection could easily be eliminated. Further, the DOC arithmetic module 14 shown here in FIG. 3 provides estimates for a single channel of a component video system, and it should be understood that the system of FIG. 1 would be replicated for additional channels. However, composite video signals may also be accommodated by providing tapped delay lines and a DOC arithmetic module that supplies estimates relevant to a composite video signal, e.g. as shown in U.S. patent application Ser. No. 170,811, filed July 21, 1980, entitled "Two Dimensional Adaptive Dropout Compensator and Chroma Inverter" and assigned to the assignee of the present invention, now U.S. Pat. No. 4,376,955. It is intended that the scope of this invention be an error management system that utilizes information regarding dropout severity to select among different methods of error concealment.

What is claimed is:

1. Apparatus for concealing an erroneous sample of a sampled digital video signal, said apparatus comprising:
a plurality of estimate generating means for generating a plurality of estimates of the value of said erroneous sample by averaging samples proximate said erroneous sample, comprising an adaptive average estimate generator for generating an adaptive average estimate, a four-sample average estimate generator for generating a four-sample average estimate, a vertical average estimate generator for generating a vertical average estimate, and a horizontal average estimate generator for generating a horizontal average estimate;
error determining means including an error detector responsive to said sampled digital video signal for providing defect signals indicating which of said samples proximate said erroneous sample are defective;
logic gate means having a plurality of inputs coupled to receive said defect signals for providing a control signal responsive to said defect signals; and
selecting means having a plurality of inputs coupled to receive said plurality of estimates of the value of said erroneous sample, and also having an output terminal to which a selected one of said plurality of estimates of the value of said erroneous sample is coupled, and having a control input coupled to receive said control signal and being responsive to said control signal for coupling to said output terminal said adaptive average when said control signal indicates that none of said samples proximate said erroneous sample are defective samples, said four-sample average when said control signal indicates that some of said samples proximate said erroneous sample are defective but none of said samples proximate said erroneous sample which are both horizontally and vertically adjacent said erroneous sample are defective, said vertical average when said control signal indicates that some of said samples proximate said erroneous sample are defective but none of the vertically adjacent samples proximate said erroneous sample are defective, and said horizontal average when said control signal indicates that some of said samples proximate said erroneous sample are defective but none of the horizontally adjacent samples proximate said erroneous sample are defective.

2. Apparatus for concealing an erroneous sample of a sampled digital video signal, said apparatus comprising:
a plurality of estimate generating means for generating from signal samples proximate said erroneous sample (a) a four-sample average estimate (b) a vertical average estimate, (c) a horizontal average estimate, and (d) an adaptive estimate of the value of said erroneous sample, wherein said adaptive average estimate generating means includes means for computing the amplitude difference between horizontally adjacent samples in at least one line adjacent the line including said erroneous sample and providing said horizontal average estimate if said amplitude difference is less than a selected amount and said vertical average estimate if said amplitude difference is greater than said selected amount;
determining means including a defect detector responsive to said sampled digital video signal for providing defect flag signals indicative of which of said samples proximate said erroneous sample are defective samples;
logic gate means having a plurality of inputs coupled to receive said defect flag signals for generating a control signal; and
selecting means having a plurality of inputs coupled to receive said four-sample average estimate, said vertical average estimate, said horizontal average estimate, and said adaptive average estimate of said value of said erroneous sample, said selecting means also having a control input coupled to receive said control signal, for coupling to an output terminal of said selecting means under the control of said control signal (a) said adaptive average when said control signal indicates that none of said samples proximate said erroneous sample are defective, (b) said four-sample average when said control signal indicates that some of said samples proximate said erroneous sample are defective but none of said samples proximate said erroneous samples which are vertically and horizontally adjacent said erroneous sample are defective; (c) said vertical average when said control signal indicates that at least some of said samples proximate said erroneous sample which are diagonally and horizontally adjacent said erroneous sample are defective but that none of said samples proximate said erroneous sample which are vertically adjacent said erroneous sample are defective; and (d) said horizontal average when said control signal indicates that at least some of said proximate samples which are diagonally and horizontally adjacent said erroneous sample are defective but none of the samples horizontally adjacent said erroneous sample are defective.

3. Apparatus for concealing an erroneous sample of a sampled video signal from a source of sampled video signal, said apparatus comprising:

first average estimate generating means coupled to said source of sampled video signal for generating a first estimate of the value of said erroneous sample by averaging the values of first proximate samples located adjacent said erroneous sample in a first direction;

second average estimate generating means coupled to said source of sampled video signal for generating a second estimate of the value of said erroneous sample by averaging the value of second proximate samples located adjacent said erroneous sample in a second direction;

control signal generating means coupled to said source of sampled video signal for generating a control signal indicative of the presence of a defect in one of said first and second proximate samples, whereby one of said first estimate and said second estimate, respectively, is incorrect; and selecting means coupled to said first average estimate generating means, to said second average estimate generating means, and to said control signal generating means for selecting as a replacement signal for said erroneous sample said first estimate when said control signal indicates the presence of a defect in one of said second proximate samples and for selecting said second estimate when said control signal indicates a defect in one of said first proximate samples.

4. Apparatus as recited in claim 3 wherein:

said first direction is the vertical direction and said second direction is the horizontal direction.

* * * * *